US009535953B2

(12) United States Patent
Abdellatif et al.

(10) Patent No.: US 9,535,953 B2
(45) Date of Patent: Jan. 3, 2017

(54) SYSTEMS AND METHODS FOR MANAGING A DATABASE

(75) Inventors: Taoufik B. Abdellatif, Austin, TX (US); Suresh Subbiah, Plano, TX (US); Awny K. Al-Omari, Ceder Park, TX (US); Hansjorg Zeller, Los Altos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 833 days.

(21) Appl. No.: 12/950,397

(22) Filed: Nov. 19, 2010

(65) Prior Publication Data
US 2012/0130986 A1    May 24, 2012

(51) Int. Cl.
*G06F 7/00* (2006.01)
*G06F 17/30* (2006.01)

(52) U.S. Cl.
CPC .............. *G06F 17/30463* (2013.01)

(58) Field of Classification Search
CPC .............................................. G06F 17/30463
See application file for complete search history.

(56) References Cited

U.S. PATENT DOCUMENTS

| 7,167,848 | B2* | 1/2007 | Boukouvalas et al. ......... 706/14 |
| 7,831,593 | B2* | 11/2010 | Burger et al. .................. 707/718 |
| 2007/0156736 | A1* | 7/2007 | Bestgen et al. ................ 707/101 |
| 2007/0208695 | A1 | 9/2007 | Burger et al. |
| 2008/0091646 | A1 | 4/2008 | Al-Omari et al. |
| 2008/0104014 | A1 | 5/2008 | Burger et al. |
| 2008/0183684 | A1* | 7/2008 | Bestgen et al. ................. 707/4 |
| 2008/0313131 | A1* | 12/2008 | Friedman et al. ................ 707/2 |
| 2010/0223253 | A1 | 9/2010 | Gopal et al. |

* cited by examiner

*Primary Examiner* — Boris Gorney
*Assistant Examiner* — Christy Y Kim
(74) *Attorney, Agent, or Firm* — Tarolli, Sundheim, Covell & Tummino L.L.P.

(57) ABSTRACT

One example discloses a database management system that can comprise a memory for storing computer executable instructions and a processing unit for accessing the memory and executing the computer executable instructions. The computer executable instructions can comprise a query data collector to access a query repository table to determine if a first query plan for a first configuration executed on a relational database has a lowest resource cost of execution between the first query plan and a second query plan for a second configuration. The query repository table can include a plurality of query records with annotated query plans, each annotated query plan comprising text sufficient to generate a query plan of a certain form.

12 Claims, 6 Drawing Sheets

SYSTEMS AND METHODS FOR MANAGING A DATABASE

BACKGROUND

Relational database systems store tables of data which are typically linked together by relationships that simplify the storage of data and make queries of the data more efficient. Structured Query Language (SQL) is a standardized language for creating and operating on relational databases.

Relational database systems can have the capability to save a compiled execution plan for an SQL query and to re-use the saved plan for subsequent execution of the same query. Storing the compiled execution plan saves the resource cost (e.g. processing time) of having to repeatedly parse and optimize frequently executed queries. A relational database system typically includes an optimizer that plans the execution of SQL queries. The optimizer's chosen plan for a given query can change as data characteristics change or the optimizer's software itself changes.

DETAILED DESCRIPTION

Figure 1:
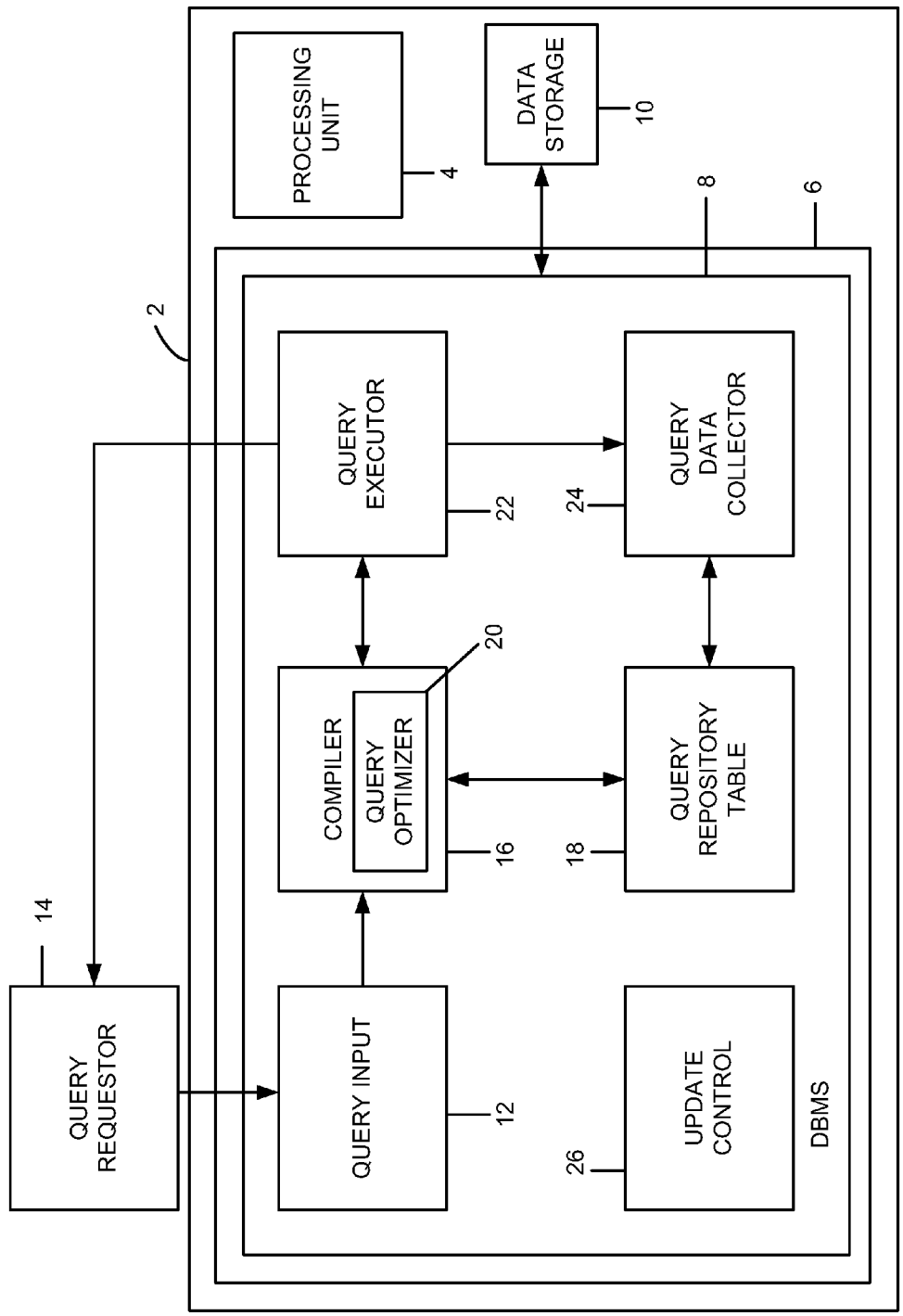
FIG. 1 illustrates an example of a database management system.

FIG. 1 illustrates an example schematic block diagram a system 2 for managing a database. The system can include a processing unit 4 and a memory 6. Where the disclosure or claims recite "a," "an," "a first," or "another" element, or the equivalent thereof, it should be interpreted to include one or more than one such element, neither requiring nor excluding two or more such elements. The memory 6 can be employed to store data and computer executable instructions. The processing unit 4 can access the memory 6 and execute the computer executable instructions. The processor can include a processing core. The memory 6 can be implemented as a computer readable medium, such as random access memory (RAM), non-volatile memory, etc.

The memory 6 can include a database management system (DBMS) 8 that accesses a database stored in data storage 10. The DBMS 8 can be implemented, for example, as computer executable instructions stored in the memory 6. The data storage 10 could be implemented, for example as a computer readable medium, such as a hard disk system, a solid state drive system, random access memory (volatile or non-volatile), etc. The database can be implemented, for example, as a relational database that can be queried using Structured Query Language (SQL).

For purposes of simplification of explanation, in the present example, different components of the DBMS 8 are illustrated and described as performing different functions. However, one of ordinary skill in the art will understand and appreciate that the functions of the described components can be performed by different components, and the functionality of several components can be combined and executed on a single component. The DBMS 8 can include a query input 12 (e.g., a queue) that receives a query from a query requestor 14. The query input 12 could be implemented, for example, as computer executable instructions stored in the memory 6. The query requestor 14 could be, for example, a system external to the DBMS 8, such as an application executing on another computer. For instance, the query from the query requestor 14 could be implemented as a web browser. One of ordinary skill in the art will understand and appreciate the various systems and methods for inputting a query into the query input 12.

The received query can be provided from the query input 12 to a compiler 16 of the DBMS 8. The compiler 16 could be implemented, for example, as computer executable instructions stored in the memory 6. Upon receipt of the query, the compiler 16 can generate a cache key (e.g., a query signature) and a configuration-id based on text and environment settings of the received query. For instance, generation of the cache key can be based for example, on semantics used in the received query. In one example, the cache key could be based on a name of tables to join, columns to be selected and the selectivity of each predicate used in the received query. Thus, the cache key could be employed to describe the entire semantics of the received query. In one example, two queries that differ only in values of constants or literals for particular predicates might have the same cache key. The cache key can also be based on a subset of the semantics of the query, such that similar queries can have the same cache key. The generated configuration-id can be implemented, for example, as data that characterizes a current configuration state of the system 2. The generated configuration-id can also include information the current version of the compiler 16. The cache key can be employed to access a query repository table 18 to determine if an annotated query plan for the received query has been previously generated. The query repository table 18 could be implemented, for example, as computer executable instructions stored in the memory 6.

Figure 2:
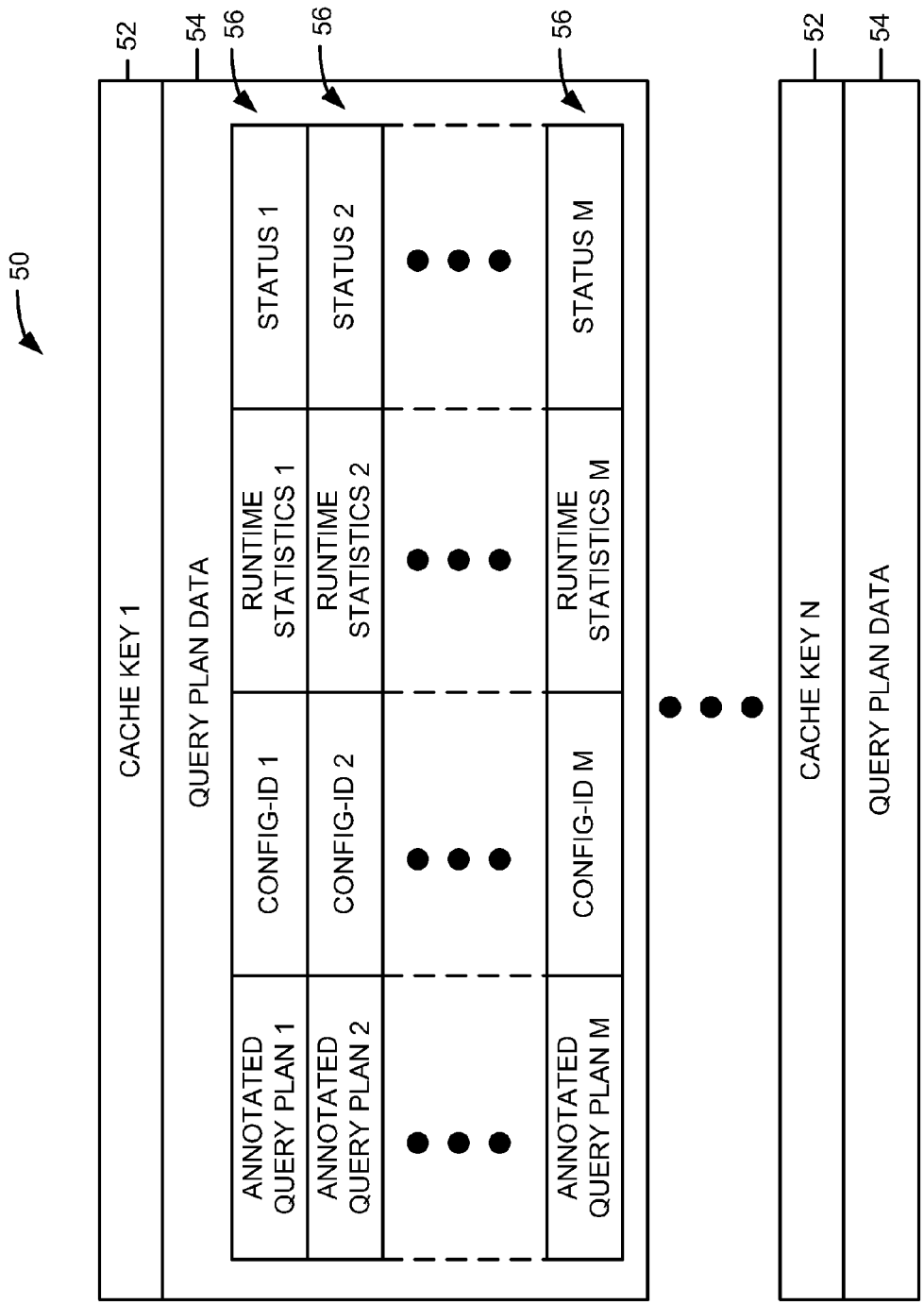
FIG. 2 illustrates an example of a query repository table.

FIG. 2 illustrates an example of a query repository table 50 that could be accessed by the compiler 16 illustrated in FIG. 1. The query repository table 50 can be implemented, for example, as a look-up table. The query repository table 50 can include N number of cache keys 52, where N is an integer greater than or equal to one. Each cache key 52 can be associated with query plan data 54. For purposes of simplification of explanation, only the details of query plan data 54 for cache key 1 are explained herein. The query plan data 54 includes M number of query records 56, wherein M is an integer greater than or equal to one. Each query record 56 could be implemented, for example, as a row in the query repository table 50. Each query record 56 can include an annotated query plan, labeled in FIG. 2 as "ANNOTATED QUERY PLAN." Each annotated query plan can represent a concise version (or shape) of a query plan. A query plan can be implemented as an ordered set of steps used to access or modify information in a relational database, such as the relational database stored in the data storage 10 of FIG. 1. As one example, the query plan could be conceptualized as a graph of relational operators representing a query.

The annotated query plan can include data (e.g., text) sufficient for the compiler to generate a query plan of a certain form, such as a new query plan for a similar query that has similar performance characteristics. The annotated query plan can include a proper subset (e.g., a subset that includes less than all members of a given set) of semantics included in the query plan. In one example, the annotated query plan can include join functions described in a given query plan, but can exclude identification of selected columns and predicates of the given query plan. The annotated query plan can be stored as text that can be employed for lookups in a relational database. The annotated query plan can be implemented, for example, as a text description of a shape of a query tree resulting from the execution of a query plan that is based on the annotated query plan. Stated differently, the annotated query plan could be implemented as relational operators that describe a sequence of operations for performing a query. The same annotated query plan can be employed to generate different query plans for different queries that have the same SQL searching functions but different literals, constants and/or scalar functions, such that the results of the execution the different query plans will be different.

A given query record 56 can further include a configuration-id, labeled in FIG. 2 as "CONFIG-ID." The configuration-id can be implemented, for example, as data that characterizes a configuration state of a system, as described with respect to FIG. 1. A given query record 56 can further include a set of runtime statistics, labeled in FIG. 2 as "RUNTIME STATISTICS." The runtime statistics can include, for example a resource cost for executing a query plan corresponding to the annotated query plan of the given query record 56, as well as information pertaining to the results of a query executed with the query plan. The resource cost could define, for example, processing time, elapsed time for execution of the query plan, the number of rows and/or columns output as a result of the query plan, etc.

The given query record 56 can also include a status indicator, labeled in FIG. 2 as "STATUS." The status indicator can identify an execution status for the annotated query plan of the given query record 56. The status indicator can have, for example, a value indicative of FORCE, ACCEPT and REJECT. A status indicator with a value indicative of FORCE for the given query record 56 can indicate that any query performed with the associated cache key 52 of the given query record 56 should employ the annotated query plan of the given query record 56 to execute a query. A status indicator of with a value indicative of ACCEPT for the given query record 56 can indicate that the annotated query plan has an acceptable resource cost, but a more efficient query plan may be generated. A status indicator with a value indicative of REJECT for the given query record 56 can indicate that the annotated query plan for the given query record 56 has an undesirable resource cost and that the query plan should not be executed.

Referring back to FIG. 1, upon accessing the repository table 18 the compiler 16 can determine if any annotated query plans exist in the query repository table 18 for the generated cache key. If it is determined that an annotated query plan for the generated cache key does exist, the compiler 16 examines the status indicator in query records for the each existing annotated query plan associated with the generated cache key. If a status indicator for any query record has a value indicative of FORCE, referred to as a forced query record, the compiler 16 generates a query plan based on the annotated query plan of the forced query record, even if the associated configuration-id is different from the generated configuration-id (e.g., to prevent performance regression, as discussed herein). To generate the query plan based on the forced query record, the compiler 16 can employ the annotated query plan of the forced query record as a hint and/or guide to generate a query plan corresponding to the received query.

Alternatively, if (a) no annotated query plan for a query record with the same cache key as the generated cache key and the same configuration-id as the generated configuration-id exists, or (b) no query record associated with the same cache key as the generated cache key has a status indicator with a value indicative of FORCE (e.g., all such query records have a status indicator value of ACCEPT or REJECT), the compiler 16 can generate a query plan based on the received query at a query optimizer 20 of the compiler 16. The query optimizer 20 could be implemented, for example, as computer executable instructions stored in the memory 6. To generate the query plan, the query optimizer 20 employs heuristics and/or logic to estimate the most efficient way to execute a query. The query optimizer 20 considers the possible query plans for a given input query, and attempts to determine which of those plans will be the most efficient. As one example, cost-based query optimizers assign an estimated cost to each possible query plan, and choose the plan with the smallest cost. In such an example, costs can be used to estimate the runtime cost of evaluating the query, in terms of the number of input/output operations required, processing requirements, and other factors determined from a data dictionary. The set of query plans examined can be formed by examining the possible access paths (e.g. index scan, sequential scan) and join algorithms (e.g. sort-merge join, hash join, nested loop join). The search space can become quite large depending on the complexity of the SQL query. The generated query plan can represent the query optimizer's best estimate for the most efficient query plan based on the query provided to the compiler 16.

The generated query plan can be implemented as computer readable binary code for implementing the query plan. In some examples, most of the resource cost (often as much as about 90%) associated with generating the query plan can be associated with heuristic searches performed by the query optimizer 20 to generate SQL logic. In such examples, only a relatively small portion of the resource cost (as little as about 10%) can be associated with conversion of SQL logic of a query plan into computer readable code. Thus, tremendous resource cost savings can be attained by employing the existing annotated query plans in query records as discussed above. Moreover, since the same query record can be used to implement multiple queries (e.g., by adding literals constants and/or scalar functions) the resource cost savings can be increased even further.

Whether the generated query plan was generated based on an existing annotated query plan or not, the generated query plan and the cache key can be provided to a query executor 22 of the DBMS 8. The query executor 22 could be implemented, for example, as computer executable instructions stored in the memory 6. The generated query plan can be implemented as an ordered set of steps used to access or modify information in a SQL relational database. The query executor 22 can employ the generated query plan to query the relational database stored in the data storage 10. Results of the query, typically in the form of data, can be provided to the query requestor 14. Additionally, runtime statistics that characterize a resource cost of executing the generated query plan, the cache key, as well as the generated query plan itself can be provided to a query data collector 24. The query data collector could be implemented, for example, as computer executable instructions stored in the memory 6.

If the generated query plan is based on an existing annotated query plan, the query data collector 24 can access the query repository table 18 and update or insert the configuration-id and the runtime statistics of the annotated query plan in the query repository table 18 to reflect the generated configuration-id and the runtime statistics most recently observed by the query executor 22. Moreover, the query data collector 24 can also examine runtime statistics of other annotated query plans with the same cache key (if any exist) to determine if the annotated query plan on which the generated query plan is based still has the lowest resource cost. If it is determined that a different annotated query plan associated with the same cache key has a lower resource cost, a status indicator for the different query plan can be changed to a value indicative of FORCE, while a status indicator associated with the annotated query plan on which the generated query plan is based can be changed to a value indicative of REJECT. Moreover, if the configuration-id associated with the different query plan (with the lower resource cost) has a configuration-id characterizing a previous version of the system 2, it can be determined that an update to the system 2 (e.g., an update to the compiler 16) caused a regression in performance of queries for the received query. In this manner, the system 2 can prevent regression for future executions of the received query (or queries similar to the received query) since the status indicator associated with the annotated query plan (with a lower resource cost) is assigned a value indicative of FORCE.

Alternatively, if generated query plan was not based on an existing annotated query plan, the compiler 16 can generate an annotated query plan based on the generated query plan by summarizing the relational operators that describe the shape of a tree in the query plan, such that multiple query plans can be formed from the same annotated query plan. The query data collector 24 can store the cache key, the annotated query plan, the generated configuration-id, the runtime statistics associated with the generated query plan and the status for the annotated query plan in the query repository table 18 as a query record.

Additionally or alternatively, the query data collector 24 can also be implemented to provide additional logic for selectively updating the status indicators in the repository table 18 on factors other than the resource cost. For example, the query data collector 24 can be programmed with logic to account for a determination as to whether the annotated query plan is not permitted to run on the system. This can be the case when the query for instance, exceeded a resource limit set by the system administrator. In such a situation, the query data collector 24 can be programmed to set the status indicator of the given query to REJECT even if it has the lowest resource execution cost. In a similar fashion, the query data collector 24 can also consider factors such as the configuration-id of the query data records.

An update control 26 monitors the DMBS 8 to determine if any software and/or hardware changes have been made. Software and hardware changes can affect the performance of the DBMS 8. The update control 26 could be implemented, for example, as computer executable instructions stored in the memory 6. As one example, changes to the relational database and/or the data storage 10 can change a resultant query plan generated from a given query inputted into the same query optimizer 20. For instance, if a significant amount of data was added to the relational database and/or a significant amount of storage space was added to the data storage 10 (e.g., adding hard disks to a hard disk array) the optimum methods for searching the relational database can change. In a similar manner, changes to other hardware and/or software components of the DBMS 8 could alter processes taken by the query optimizer 20 in estimating the most efficient query plan, such that the same inputted query could result in the generation of two different query plans based on the configuration of the DBMS 8 and/or the data storage 10. Furthermore, as computer science and engineering technologies continue to advance, periodic updates to the query optimizer 20 can occur. New/changed heuristics and/or logic can be implemented in a new query optimizer 20 that can change a resultant query generated from a given inputted query, since different versions of the query optimizer 20 can employ the new/changed heuristics and/or logic for estimating the query plan.

The update control 26 can detect such changes to the hardware and/or software of the DBMS 8 and/or the data storage 10 and determine if a new configuration-id should be generated. Such a determination can be based, for example, on the likelihood that the changes could result in a change to the actual cost of executing queries. As one example, a change to the compiler 16, such as the aforementioned update to the query optimizer 20 could result in the update control 26 determining if query plans can be impacted. If the update control 26 determines that an update should be made, the update control 26 can generate a new configuration-id based on the current state of the system 2.

In this manner, after the update control 26 generates the new configuration-id, the first time that a query associated with a specific cache key is received at the compiler 16 for the new configuration-id, the compiler 16 can compile a query plan based on the received query, even if an annotated query plan in the query repository table 18 with the same cache key does exist, for previous configuration-ids. Furthermore, in instances where an annotated query plan with the same cache key as an inputted plan does exist, the query data collector 24 will examine the runtime statistics of the newly created query plan to determine if employment of the existing annotated query plan would result in a more efficient query plan. If the determination is positive, the query data collector 24 stores the query plan record in the manner described above, wherein the query plan record has a status indicator value of ACCEPT. Moreover, if the determination is positive, the query data collector 24 can also change the status indicator of the query plan record with the lowest resource cost to FORCE. Furthermore, the query data collector 24 can set a status indicator of other query records associated with the specific cache key can be changed from FORCE to ACCEPT.

Typically, most changes to hardware and/or software (particularly changes to the query optimizer 20) result in a more efficient query plan being generated for the same query than the previous version of the query optimizer 20. However, it is possible that some for some queries the newly created query will cause performance degradation, such that the resource cost for executing a particular query can increase by an order of magnitude of ten or more. By utilization of the DBMS 8, regressions in performance of the execution of a query due to changes in the software and/or the hardware can be avoided or mitigated. Additionally, since the compiler 16 generates query plans based on annotated query plans, incompatibilities can be avoided, since new runtime code for the query plan can be generated each time the compiler 16 generates a query plan whether or not the generated query plan is based on an existing annotated query plan.

Furthermore, in some examples, the compiler 16 can access the query repository table 18 to examine runtime statistics and/or query data output by the query executor 22 for each query record for each cache key. In such a situation, the runtime statistics and/or the query data can be used to update the heuristics and/or logic functions of the query optimizer 20. Such updates can improve the estimations made by the query optimizer 20.

In view of the foregoing structural and functional features described above, example methodologies will be better appreciated with reference to FIGS. 3-6. While, for purposes of simplicity of explanation, the methodologies of FIGS. 3-6 are shown and described as executing serially, it is to be understood and appreciated that the present invention is not limited by the illustrated order, as some actions could in other examples occur in different orders and/or concurrently from that shown and described herein.

Figure 3:
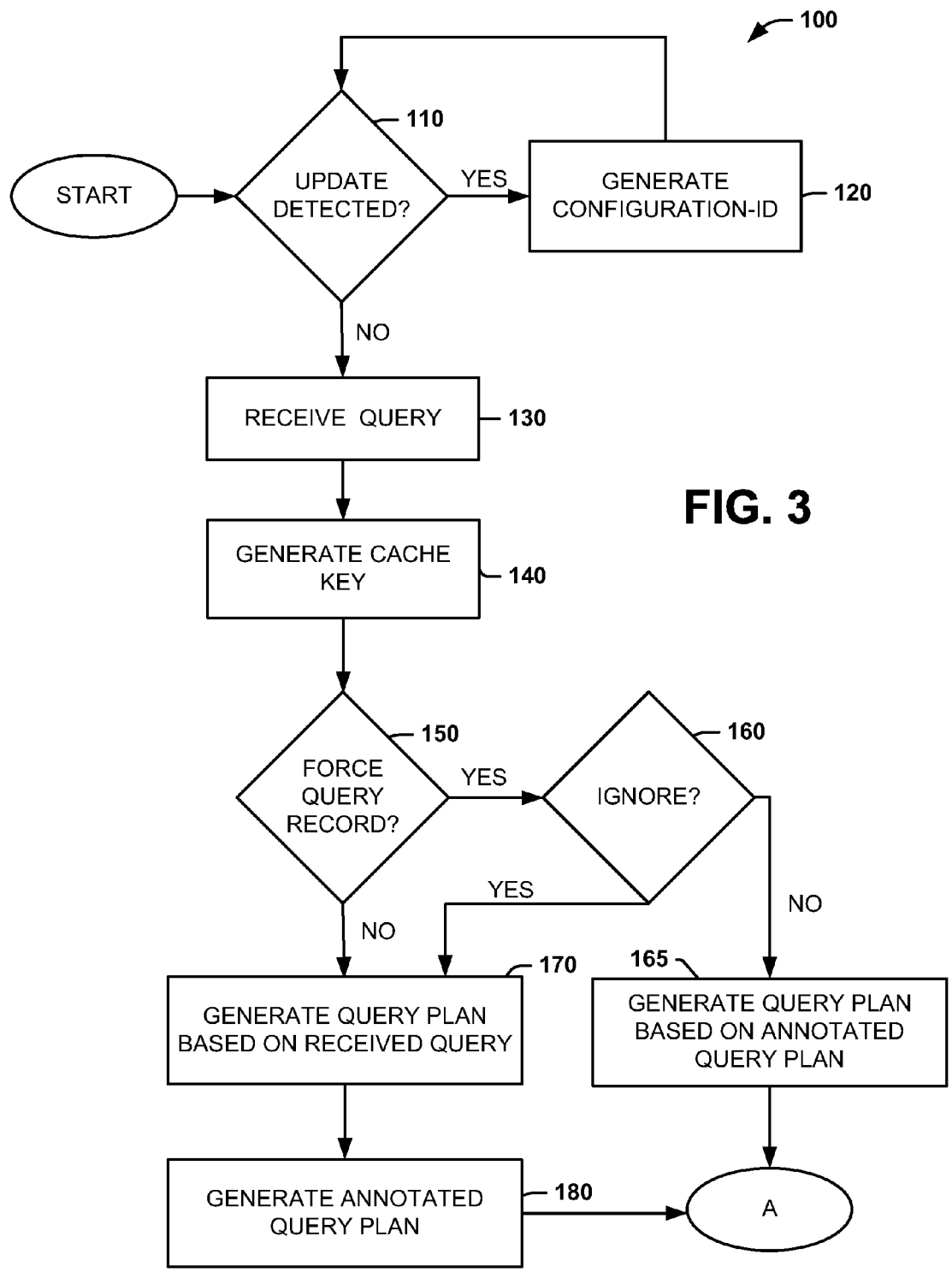
FIGS. 3-4 illustrate an example of a flowchart of a method for managing a database system.
Figure 4:
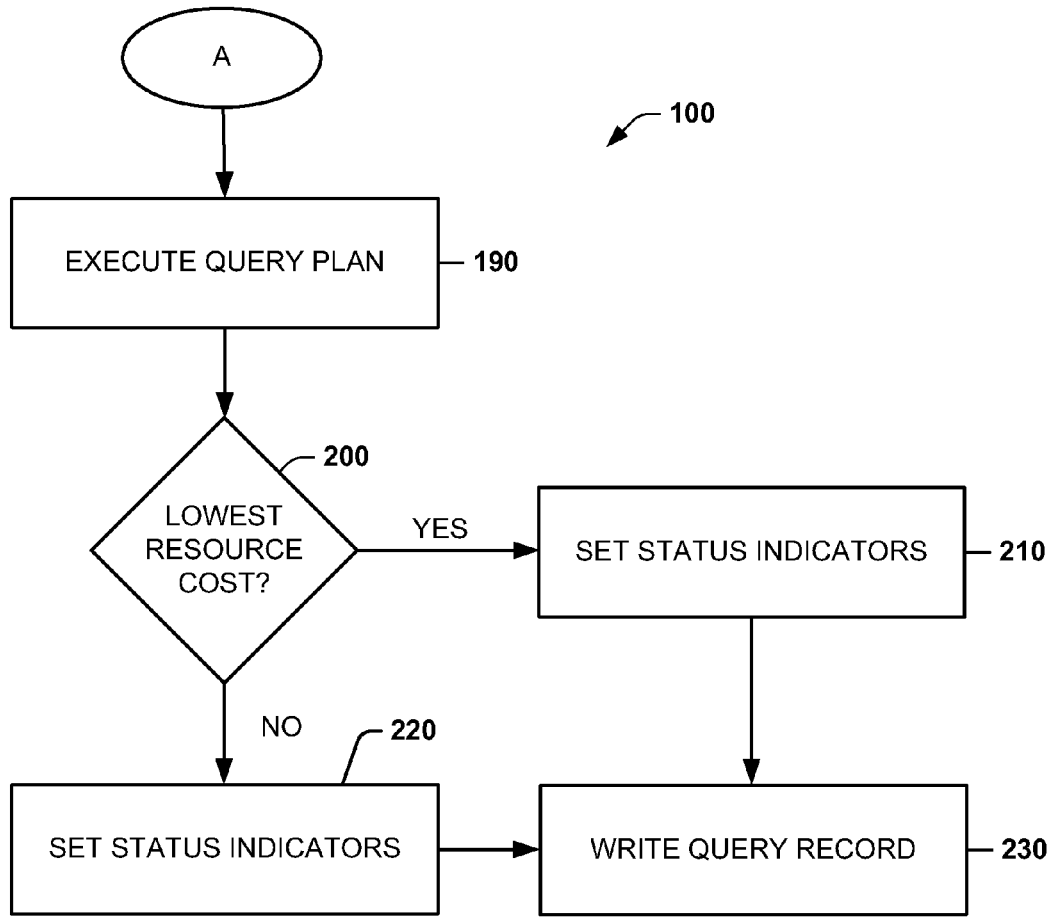

FIGS. 3-4 illustrate a flow chart of an example method 100 for managing a database. The method 100 could be executed, for example, by a DBMS. At 110, a determination can be made as to whether updates are detected in the DBMS. The updates can be, for example, to software and/or hardware components. The updates can be detected, for example, at an update control of the DBMS. If the determination at 110 is positive (e.g., YES), the method 100 proceeds to 120, if the determination is negative (e.g., NO), the method 100 proceeds to 130. At 120, a configuration-id can be generated, which configuration-id can be designated as a current configuration-id. The configuration-id can be generated, for example, by the update control. Upon generating the configuration-id, the method 100 can return to 110.

At 130, a query for a relational database can be received, for example, at a compiler of the DBMS. The query can be received, for example, at a query input of the DBMS and forwarded to the compiler of the DBMS. The query can be provided, for example, by an external application, such as a web browser operating on a computer external to the DBMS. At 140, a cache key can be generated for the received query at the compiler. The cache key can be generated, for example, by the compiler, as described herein. At 150, the compiler can make a determination as to whether a query record associated with the same cache key as the generated cache key is stored in the query repository table and if that query record has a status indicator value of FORCE. If the determination at 150 is positive (e.g., YES), the query record is retrieved by the compiler, and the method 100 proceeds to 160. If the determination at 150 is negative (e.g., NO), the method 100 proceeds to 170.

At 160, a determination can be made as to whether to ignore the retrieved query record. In some examples, the compiler may ignore the retrieved query record when the compiler does not find any associated records for the current configuration-id. Moreover, the compiler can be programmed to ignore the retrieved query record in a number of situations, such as the first time a query is run after the generation of a new configuration-id and/or the ignoring can be done at random intervals. The ignoring can be implemented to assist the compiler in determining when it is no longer necessary to force execution of particular query plan. If the determination at 160 is positive (e.g., YES), the method 100 can proceed to 170, and the retrieved query record can be ignored. If the determination at 160 is negative (e.g., NO), the method 100 proceeds to 165, and the retrieved record is not ignored.

At 165, the compiler can employ an annotated query plan of the retrieved query record to generate a query plan. Generation of the query plan can include, for example, employment of text stored in the annotated query plan as a hint and/or guide for the compiler, and the method 100 can proceed to 190. At 170, the compiler can employ a query optimizer to generate a query plan based on the received query. At 180, an annotated query plan can be generated for the executed query plan by the compiler and provided to the query data collector. The annotated query plan can be implemented as text employable as a hint and/or guide for generating a query plan, such as described herein, wherein the executed query plan can be regenerated from the annotated query plan. The method 100 can proceed to 190.

At 190, the query plan can be executed, for example, at a query executor of the DBMS. Results of the execution of the query plan can be provided, for example, to the query requestor. Additionally, information regarding the current configuration-id, the runtime statistics, including resource cost of executing the query can be provided to a query data collector of the DBMS.

At 200, a determination can be made as to whether the executed query plan has the lowest resource cost of existing annotated query plans with the same cache key and possibly different configuration-ids. To make the determination, the query data collector can access the query repository to examine the configuration-ids and the runtime statistics of query records associated with the same cache key as the executed query plan. If the runtime statistics of a query record with the same cache key as the executed query plan do not indicate that an associated annotated query plan has a lower resource cost than the executed query plan, the determination can be positive (e.g., YES), and the method 100 can proceed to 210. If the runtime statistics of a query record with the same cache key as the executed query plan indicate that an associated annotated query plan does have a lower resource cost than the executed query plan, the determination can be negative (e.g., NO), and the method 100 can proceed to 220.

At 210, a status indicator for the executed query can be set to a value indicative of ACCEPT. At 230, a query record corresponding to the executed query can be written into the query repository table as query data for a cache key with the same cache key as the query received by the compiler. The query record can include, for example, the current configuration-id, the runtime statistics of the executed query plan, the annotated query plan and the status indicator. Additionally, a status indicator associated with another annotated query plan with a value indicative of FORCE can be set to a value indicative of ACCEPT if the other query plan (with a status indicator value of FORCE) is associated with a resource cost greater than or equal to the resource cost of the executed query.

At 220, values for the status indicators for query records associated with the same cache key as the executed query record can be set. The setting can include, for example, setting the status indicator of the query record with the lowest resource cost that is associated with the same cache key as the executed query plan to a value indicative of FORCE. Moreover, the configuration-id of the query record with the lowest resource cost can be examined to determine if updates to the DBMS detected at 110 caused a performance regression.

At 230, a query record corresponding to the executed query can be written into the query repository table as query data for a cache key with the same cache key as the query received by the compiler. The query record can include, for example, the currently configuration-id, the runtime statistics of the executed query plan, the annotated query plan generated by the query data collector and the status indicator.

Figure 5:
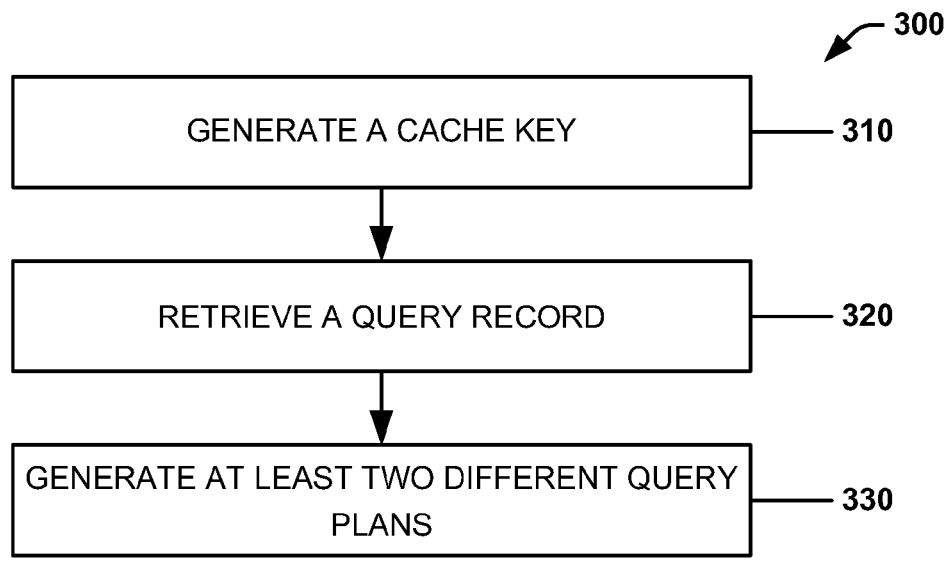
FIG. 5 illustrates another example of a flowchart of a method for managing a database system.

FIG. 5 illustrates another example of a method 300 for managing a database. At 310 a cache key for a received query can be generated. At 320, a query record can be retrieved from a query repository table. The query record can be associated with a cache key with the same value as the cache key generated for the received query. The retrieved query record comprises an annotated query plan that includes text defining a shape of query tree. At 330, at least two different query plans can be generated based on the annotated query plan of the retrieved query record.

Figure 6:
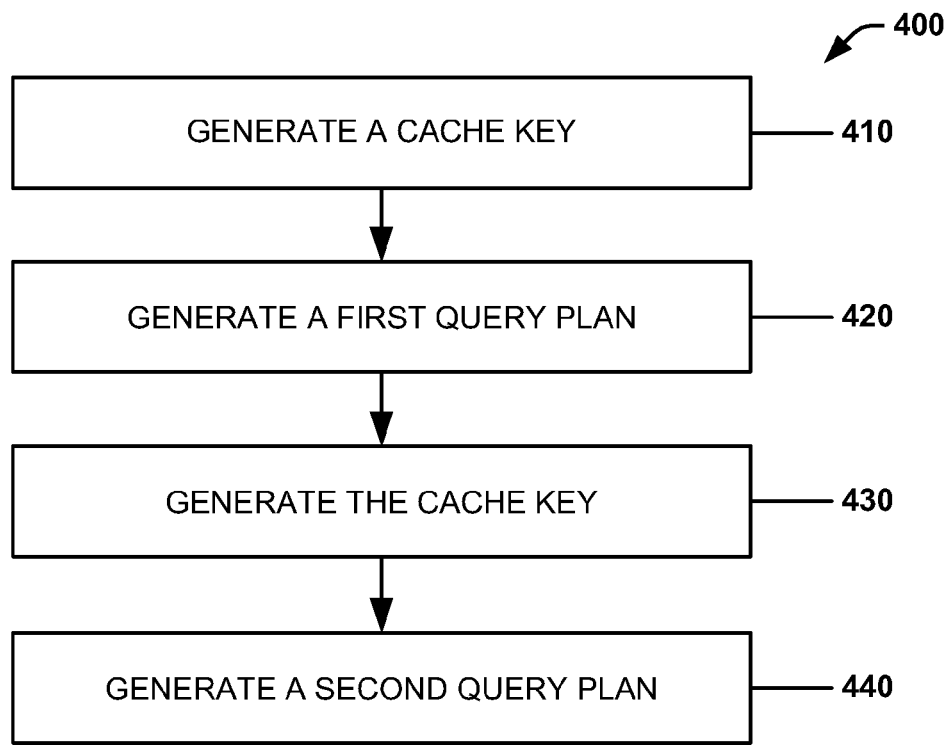
FIG. 6 illustrates yet another example of a flowchart of a method for managing a database system.

FIG. 6 illustrates another yet another example of method 400 for managing a database. At 410 a cache key based on a first received query can be generated by a compiler of a database management system. At 420, a first query plan based on the first received query can be generated by the compiler. At 430, the cache key can be generated by the compiler based on a second received query, the second received query being different than the first received query. At 440, a second query plan can be generated by the compiler and the second query plan can be different than the first query plan based on an annotated query plan stored in memory. The annotated query plan can be stored in memory before the generating of the cache key based on the first received query.

Figure 7:
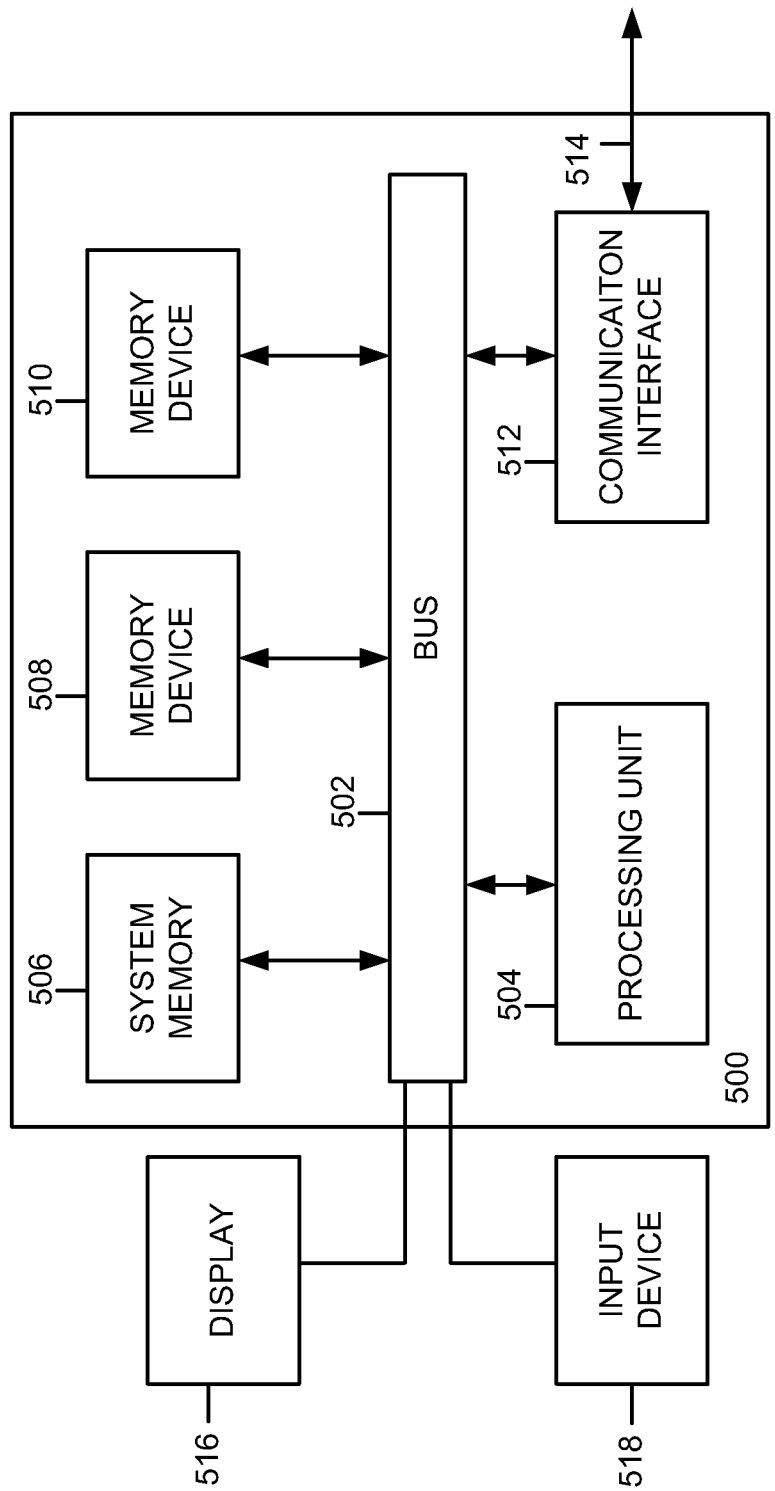
FIG. 7 illustrates an example of a computer system that can be employed to implement the systems and methods illustrated in FIGS. 1-6.

FIG. 7 is a schematic block diagram illustrating an exemplary system 500 of hardware components capable of implementing examples of the present disclosed in FIGS. 1-6, such as the DBMS 8 illustrated in FIG. 1. The system 500 can include various systems and subsystems. The system 500 can be a personal computer, a laptop computer, a workstation, a computer system, an appliance, an application-specific integrated circuit (ASIC), a server, a server blade center, a server farm, etc.

The system 500 can includes a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand alone database, or other non-volatile memory, can also be in communication with the system bus 502. The system bus 502 operably interconnects the processing unit 504, the memory devices 506-510, the communication interface 512, the display 516, and the input device 518. In some examples, the system bus 502 also operably interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508 and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio.

Additionally, the memory devices 508 and 510 can serve as databases or data storage such as the data storage 10 illustrated in FIG. 1. Additionally or alternatively, the system 500 can access an external DBMS through the communication interface 512, which can communicate with the system bus 502 and the communication link 514.

In operation, the system 500 can be used to implement a DBMS that provides results in response to a plurality of database queries. The DBMS can receive the database queries in accordance with various query database protocols including SQL. Computer executable logic for implementing the DBMS, such as the components 12 and 16-26 of the DBMS 8 illustrated in FIG. 1, can reside the system memory 506, and/or the memory devices 508 and/or 510 in accordance with certain examples. The processing unit 504 executes one or more computer executable instructions originating from the system memory 506 and the memory devices 508 and 510. In such an example, the system memory 506 and/or the memory devices 508 and/or 510 could be employed, for example, to implement the memory 6 illustrated in FIG. 1. The term "computer readable medium" as used herein refers to a medium that participates in providing instructions to the processing unit 504 for execution.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A database management system comprising:
a memory for storing computer executable instructions; and
a processing unit for accessing the memory and executing the computer executable instructions, the computer executable instructions comprising:
a compiler comprising a query optimizer to generate query plans, the compiler to:
generate a cache key based on a first received query;
generate a first query plan based on the first received query;
generate the cache key based on a second received query, the second received query having a different parameter than the first received query;
access a query repository table to change at least one of heuristic and logic functions of the query optimizer for generating the query plans, the changing of the at least one of the heuristic and logic functions of the query optimizer being based on runtime statistics stored in the query repository table, wherein the query repository table includes a plurality of query records with annotated query plans, each annotated query plan comprising text sufficient to generate a query plan of a certain form; and
generate a second query plan, different than the first query plan based on a given annotated query plan stored with a given query record of the plurality of query records in the query repository table, wherein the annotated query plan is stored in the query repository table before the generating of the cache key based on the second received query; and
a query data collector to access the query repository table to determine if the first query plan for a first configuration executed on a relational database has a lower resource cost of execution than the second query plan for a second configuration executed on the relational database.

2. The database management system of claim 1, wherein the given annotated query plan of the query record retrieved from the query repository table comprises text defining a shape of a query tree.

3. The database management system of claim 1, wherein the computer executable instructions further comprise an update control to detect hardware and software changes in the database management system, wherein upon detecting a hardware or software change, the update control sets a status indicator of the plurality of query records in the query repository table.

4. The database management system of claim 3, wherein the update control sets the status indicator by changing the status indicator from value indicative of FORCE to a value indicative of ACCEPT.

5. The database management system of claim 3, wherein the second configuration is a current configuration and the first configuration is a previous configuration, wherein a status indicator associated with the first query plan is set to a value indicative of FORCE, thereby mitigating regression caused by the hardware or software changes detected by the update control.

6. A method for managing a database comprising:
generating a cache key for a given received query;
generate the cache key based on another received query, the another received query having a different parameter than the given received query; and
access a query repository table to change at least one of heuristic and logic functions of a query optimizer for generating query plans, the changing of the at least one of the heuristic and logic functions of the query optimizer being based on runtime statistics stored in the query repository table;
retrieving a query record from the query repository table, wherein the query record is associated with the cache key generated for the given received query and the another received query, wherein the retrieved query record comprises an annotated query plan that includes text defining a shape of query tree for a relational database, wherein the retrieved query record is stored in the query repository table before the generating of the cache key based on the another received query; and
generating two different query plans based on the annotated query plan of the retrieved query record.

7. The method of claim 6, wherein the retrieved query record comprises a status indicator with a value indicative of FORCE.

8. The method of claim 7, further comprising:
executing the at least two different query plans on the relational database; and
providing runtime statistics that include a resource cost of execution for each of the at least two different query plans.

9. The method of claim 8, further comprising updating runtime statistics of the query record based on the provided runtime statistics.

10. A non-transitory computer readable medium having computer executable instructions comprising:
a compiler of a database management system to:
generate a cache key based on a first received query;
generate a first query plan based on the first received query;
generate the cache key based on a second received query, the second received query having a different parameter than the first received query;
generate a second query plan, different than the first query plan based on an annotated query plan stored in a query repository table, wherein the annotated query plan is stored in memory before the generating of the cache key based on the first received query; and
access the query repository table to change at least one of heuristic and logic functions of a query optimizer for generating query plans, the changing of the at least one of the heuristic and logic functions of the query optimizer being based on runtime statistics stored in the query repository table.

11. The non-transitory computer readable medium of claim 10, wherein the annotated query plan comprises text that defines a structured query language (SQL) relational operator that describes the shape of a query tree.

12. The non-transitory computer readable medium of claim 11, wherein the first and second query plans are based on the text of the annotated query plan.

* * * * *